(12) United States Patent
Son

(10) Patent No.: US 11,500,409 B2
(45) Date of Patent: Nov. 15, 2022

(54) ELECTRONIC ABACUS

(71) Applicant: Bum Suk Son, Bucheon-si (KR)

(72) Inventor: Bum Suk Son, Bucheon-si (KR)

( * ) Notice: Subject to any disclaimer, the term of this patent is extended or adjusted under 35 U.S.C. 154(b) by 556 days.

(21) Appl. No.: 16/633,169

(22) PCT Filed: Nov. 2, 2018

(86) PCT No.: PCT/KR2018/013273
§ 371 (c)(1),
(2) Date: Jan. 23, 2020

(87) PCT Pub. No.: WO2019/093721
PCT Pub. Date: May 16, 2019

(65) Prior Publication Data
US 2021/0157354 A1 May 27, 2021

(30) Foreign Application Priority Data
Nov. 13, 2017 (KR) .......................... 10-2017-0150648

(51) Int. Cl.
*G06C 1/00* (2006.01)
*G09B 19/02* (2006.01)
(52) U.S. Cl.
CPC ................ *G06C 1/00* (2013.01); *G09B 19/02* (2013.01)
(58) Field of Classification Search
CPC ........... G06C 1/00; G09B 19/00; G09B 19/02
See application file for complete search history.

(56) References Cited

U.S. PATENT DOCUMENTS

| D399,522 S | * | 10/1998 | Nye | ................................. D18/6 |
| 2008/0189344 A1 | * | 8/2008 | Xu | ........................ G06F 15/025 |
| | | | | 708/142 |

FOREIGN PATENT DOCUMENTS

| CN | 1077295 A | 10/1993 |
| KR | 20-0328805 Y1 | 10/2003 |
| KR | 10-2006-0109608 A | 10/2006 |
| KR | 10-2007-0011628 A | 1/2007 |
| KR | 10-0668606 B1 | 1/2007 |
| KR | 10-1749492 B1 | 6/2017 |

OTHER PUBLICATIONS

International Search Report for PCT/KR2018/013273 dated Jan. 18, 2019 from Korean Intellectual Property Office.

* cited by examiner

*Primary Examiner* — Timothy A Musselman
(74) *Attorney, Agent, or Firm* — Revolution IP, PLLC

(57) ABSTRACT

The present invention relates to an electronic abacus including: a plurality of abacus beads fitted on each of unit-specific support rods mounted on an abacus frame to be slidable in a vertical direction; an abacus bead position detecting unit including a plurality of position detecting means for detecting a position change of each abacus bead from lower parts of the abacus beads fitted on each of the unit-specific support rods; an abacus bead guide panel in which unit-specific guide blocks for guiding movement of the abacus beads fitted on each of the unit-specific support rods are integrally connected to cover all of the abacus bead position detecting unit; and a plurality of abacus bead moving members provided in a number which is the same as that of the abacus beads in the guide panel to movably support the abacus beads fitted on each of the support rods.

7 Claims, 8 Drawing Sheets

[FIG. 1A]
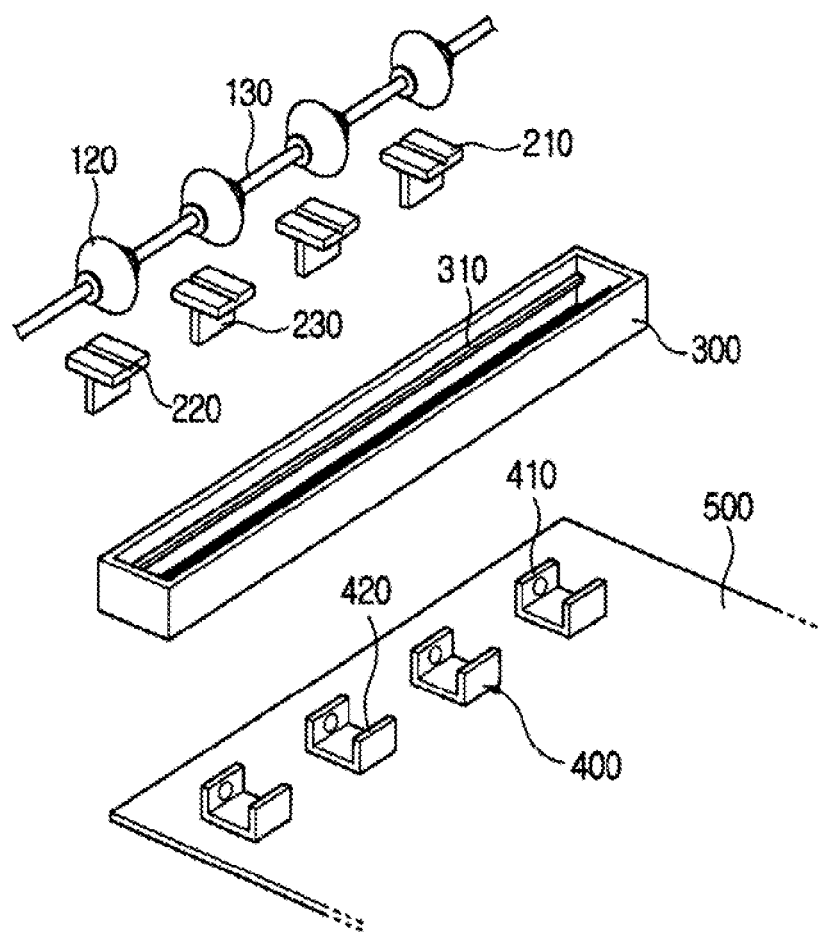

[FIG. 1B]
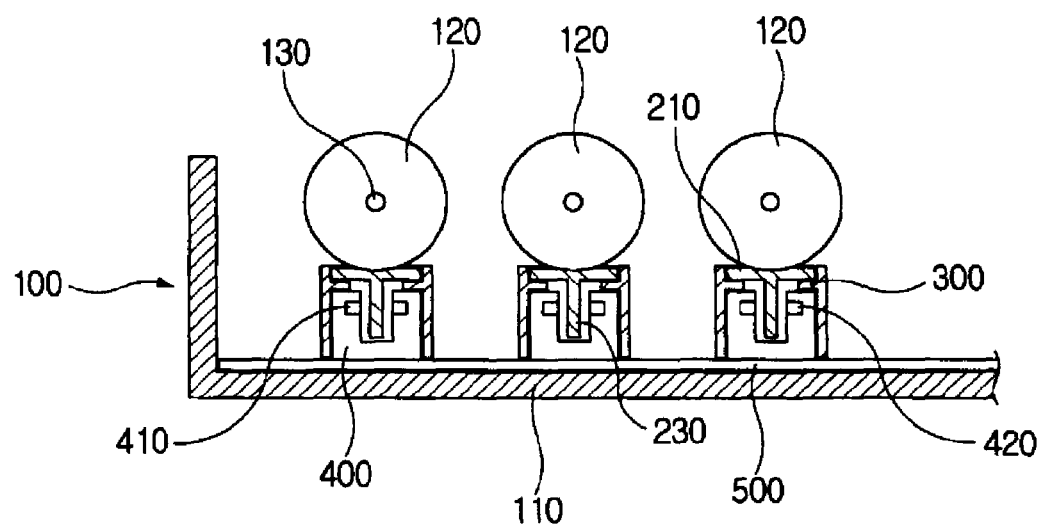

[FIG. 2]
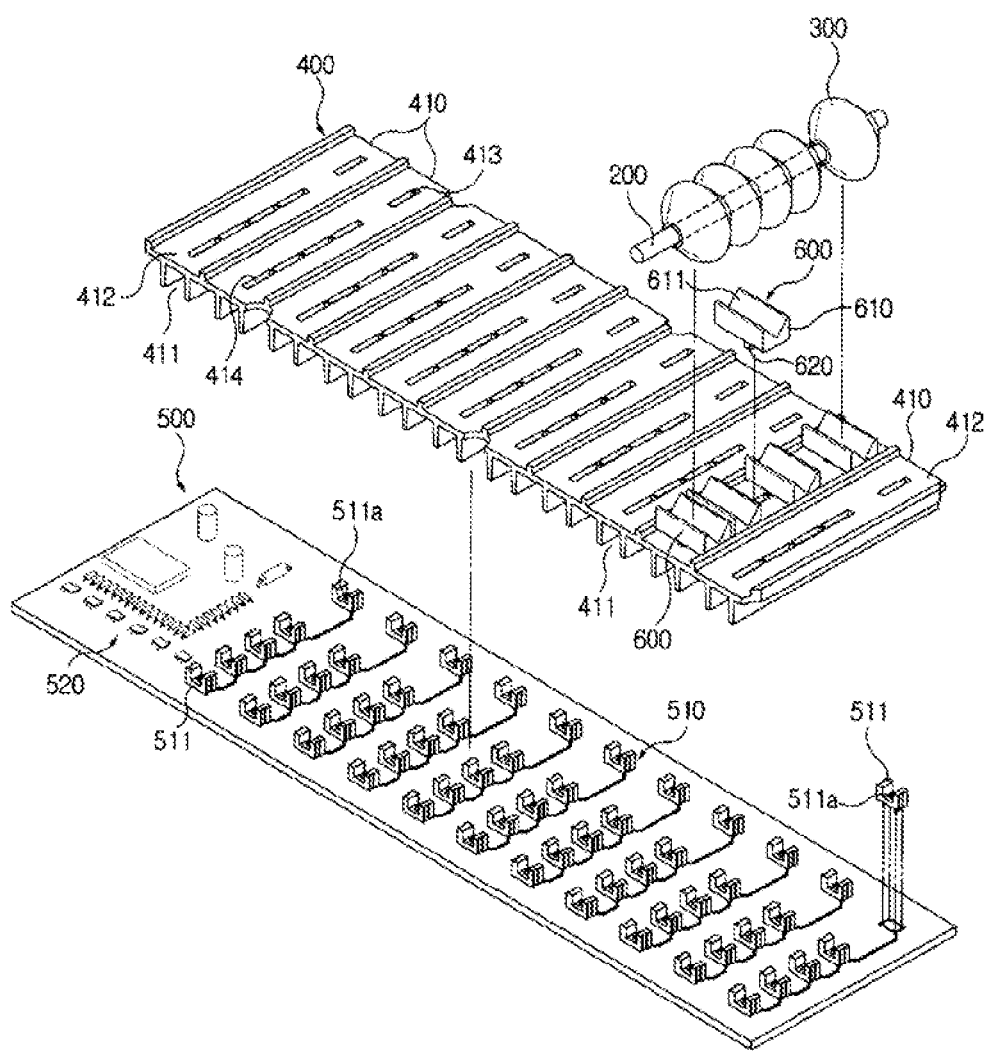

[FIG. 3A]
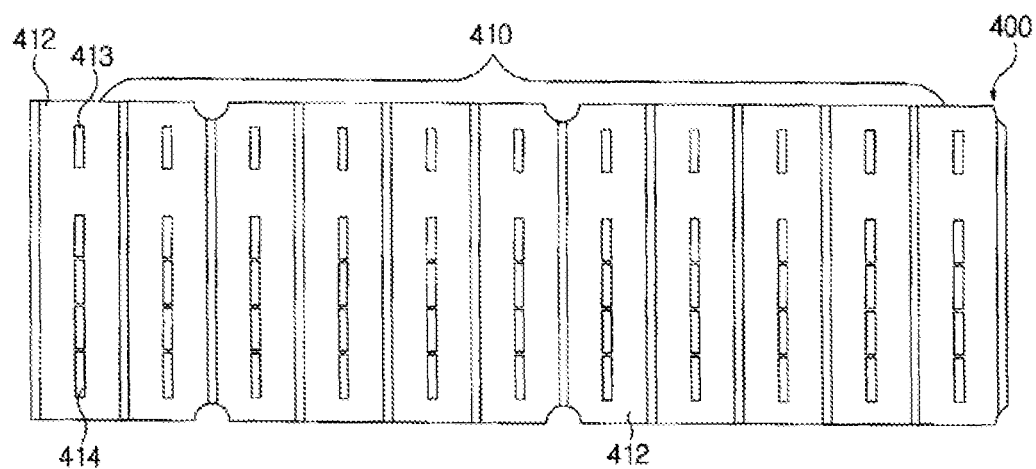
[FIG. 3B]
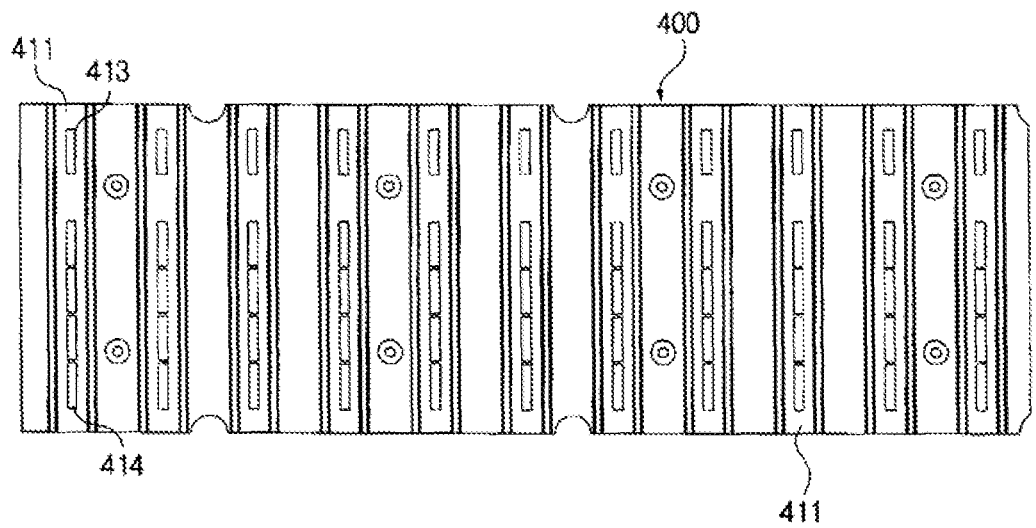

[FIG. 3C]
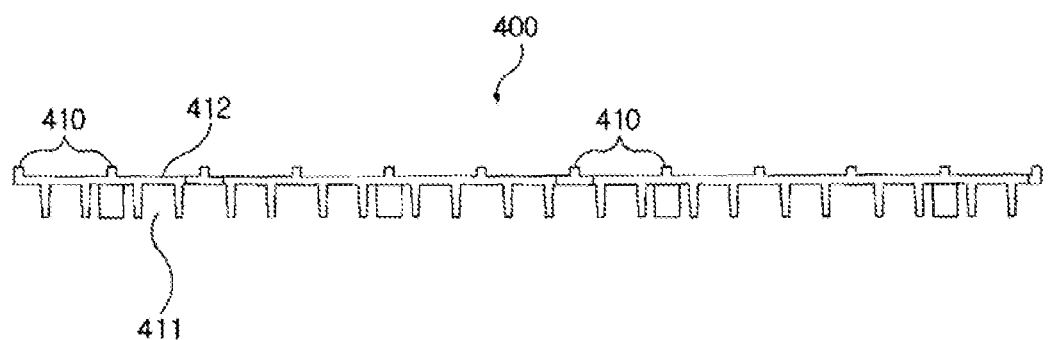
[FIG. 4A]
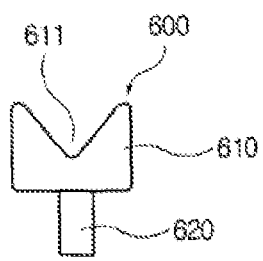
[FIG. 4B]
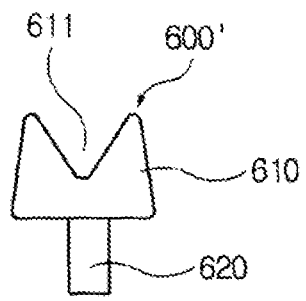

[FIG. 5A]
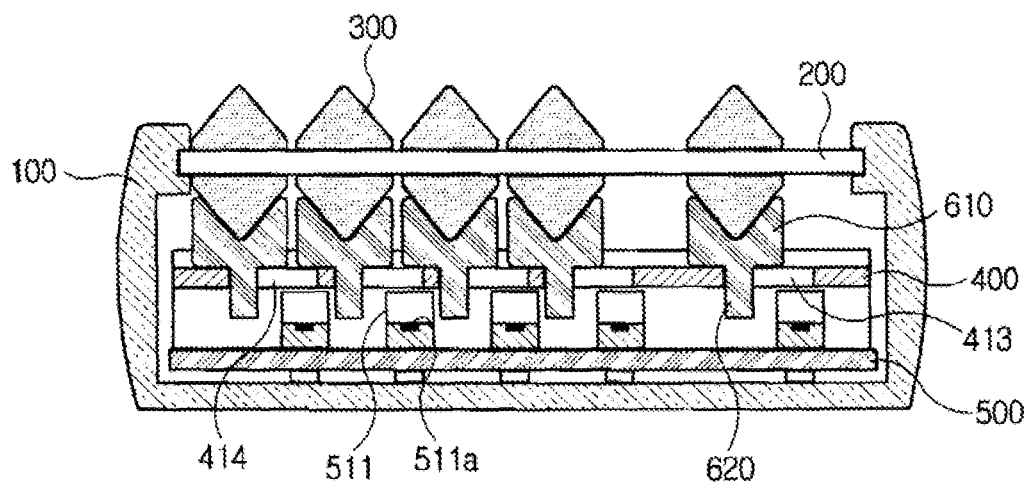
[FIG. 5B]
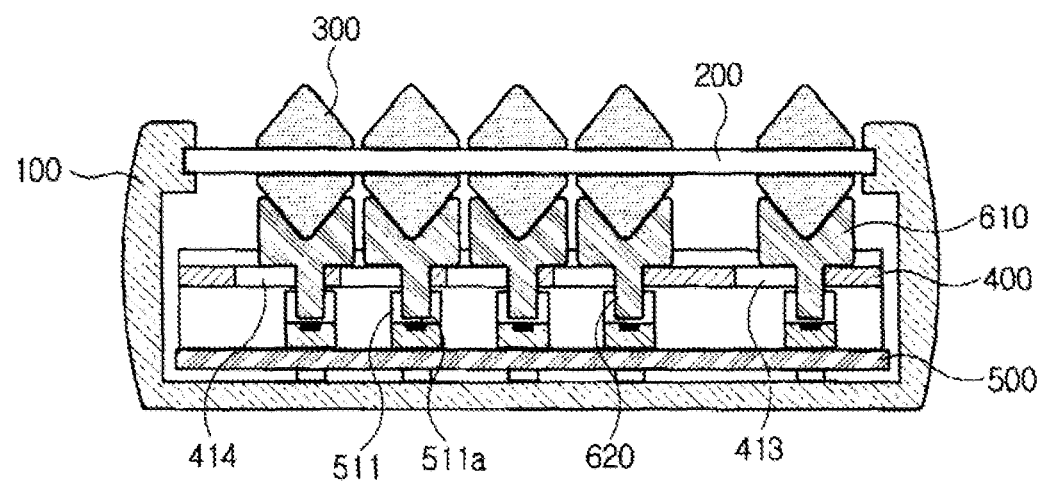

[FIG. 6]
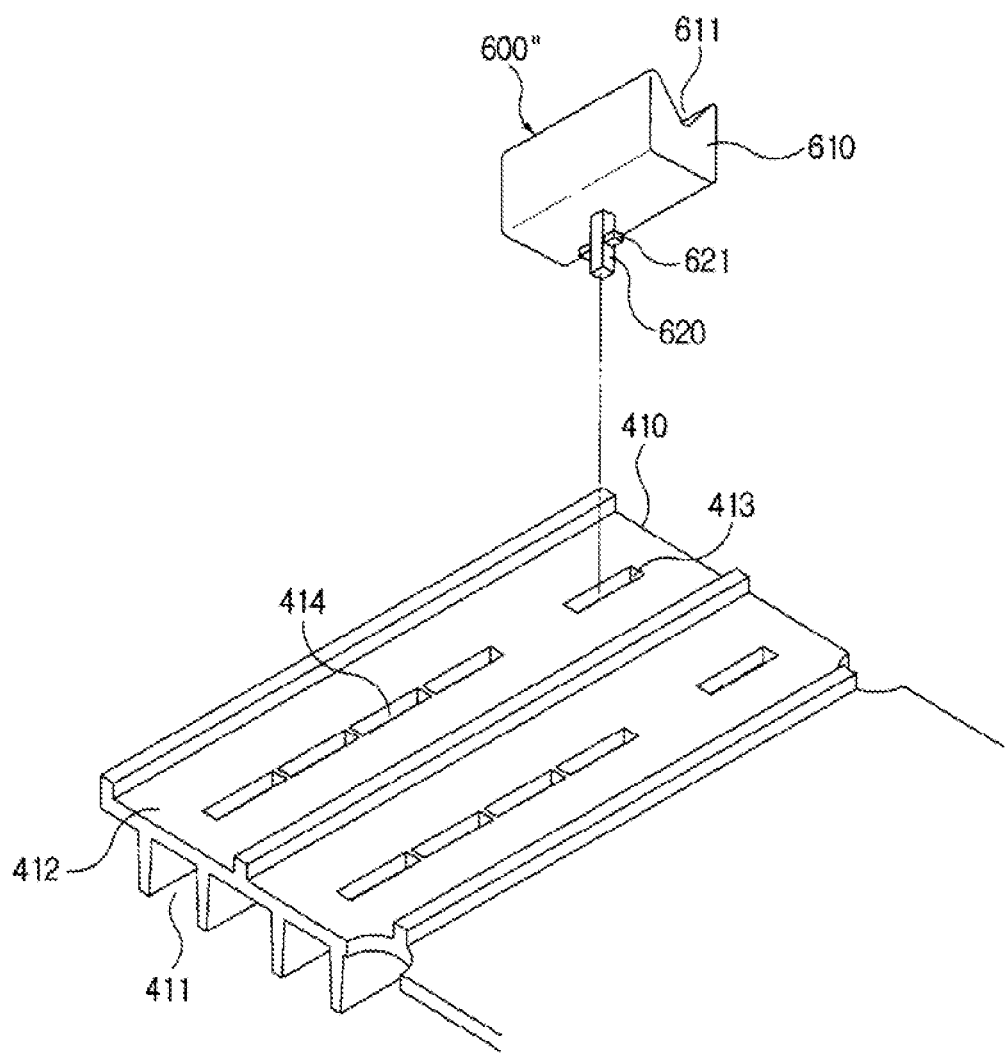

[FIG. 7]
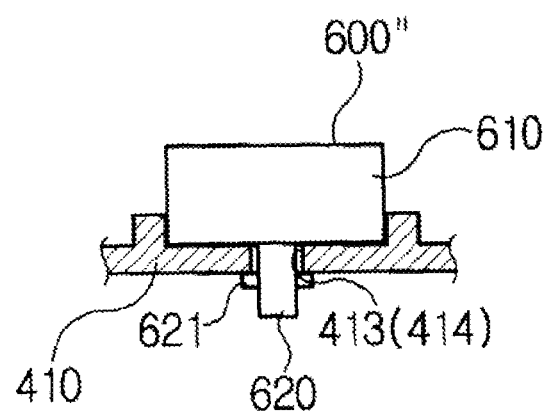

ELECTRONIC ABACUS

TECHNICAL FIELD

The present invention relates to an electronic abacus. More particularly, the present invention relates to an electronic abacus that is simple and convenient to assemble.

BACKGROUND ART

Generally, an electronic abacus is operated as follows: when a user moves an abacus bead positioned on each support rod, a magnet positioned in the abacus bead moves to generate a magnetic field, and the generated magnetic field is detected by a sensing means positioned in a lower surface of the electronic abacus, so that the movement of the abacus bead is detected. After the position of the abacus bead detected by the sensing means is converted into a digital signal and calculation information depending on the movement of the abacus bead and the position of the support rod is analyzed by an analyzing means, the analyzed data is transmitted through an USB connection port to a computer.

However, such a configuration is problematic in that the abacus bead itself or an interior of the abacus bead should be formed of a magnet to detect the position and movement of the abacus bead, so that a manufacturing process is complicated and productivity is lowered. Thus, the applicant of this invention has proposed a novel configuration in Korean Patent No. 10-0668606, entitled "Abacus bead position detecting apparatus".

According to the cited document, the abacus bead position detecting apparatus includes a plurality of abacus beads 120 that are movably fitted on each support rod 130 installed in an abacus frame 110; a plurality of abacus bead moving members 200 that come into close contact with outer circumferences of the abacus beads 120, block light from the outside, and move together as the abacus beads moves; a guide member 300 that blocks light from the outside and provides a moving path of the abacus bead moving member 200; a detecting unit 400 that detects whether the abacus bead 120 moves in the state of being spaced apart therefrom by a predetermined distance to correspond to each abacus bead moving member 200; an analysis unit (not shown) that analyzes a signal output from the detecting unit to analyze position information depending on the movement of the abacus bead; and a transmission unit (not shown) that transmits data output from the analysis unit to a computer. Each abacus bead moving member 200 includes a support plate 210 that has on an upper surface thereof an insert slot 220 coming into close contact with the outer circumference of the abacus bead 120, and a screen 230 that is formed on a lower surface of the support plate to extend downwards a predetermined length. The detecting unit 400 includes a light emitting part 410 that is installed to correspond to an original position of the abacus bead 120 and outputs a detection signal for the movement of the abacus bead, and a light receiving part 420 that receives a movement detection signal output from the light emitting part. The light emitting part 410 and the light receiving part 420 are composed of an infrared light emitting element and a light receiving element that are spaced apart from one side of the screen 230 by a predetermined distance to be parallel or opposite to each other.

Meanwhile, the electronic abacus of the above-described configuration is problematic in that the guide member is individually mounted on each row to correspond to detecting units arranged in a plurality of rows on a printed circuit board, so that it takes a long time to mount each guide member.

Furthermore, each guide member has a structure that is open on a top thereof, so that it is impossible to block light from the outside. In this case, light is introduced to thereby hinder the detection of a sensor.

Particularly, the structure shown in FIG. 4 of the cited document is problematic in that the abacus bead moving member and the abacus bead should be aligned with each other on each guide member so as to fit each abacus bead into the insert slot of the moving member, so that the assembly work is slow and cumbersome. Furthermore, since the screen provided on each moving member is almost equal in width to the support plate located at an upper position, the screen may obstruct another sensor even by slight misalignment, thus causing malfunction. This problem may be solved by reducing the width of the screen. However, in this case, the support plate located at the upper position is too heavy compared to the screen located at a lower position. Hence, for example, when the moving members lean to one side by tilting the abacus frame so as to fit the abacus beads fitted on the support rod on the moving members simultaneously, the moving members that are heavy on upper portions thereof may spill out from a state in which they are fitted into the guide members, so that the assembly work becomes slower and more cumbersome.

In addition, in order to prevent the spilling of the moving members, the width of the support plate provided on the upper portion of the moving member may be reduced in proportion to that of the screen provided on the lower portion of the moving member to adjust a weight ratio. However, in this case, the moving members lean to one side, so that their spacing does not coincide with the spacing of the abacus beads installed on the support rod. Thus, since the work of matching the position of the abacus bead with that of the moving member should be performed, the assembly work is likewise slow and cumbersome.

DISCLOSURE

Technical Problem

The present invention has been made to solve the above-mentioned problems and difficulties and relates to an electronic abacus, in which abacus beads fitted on each support rod can be mounted on an abacus bead moving member simultaneously, and the removal of moving members can be prevented even when the moving members lean to one side by tilting an abacus frame.

Technical Solution

In order to accomplish the above object, the present invention provides an electronic abacus, including a plurality of abacus beads fitted on each of unit-specific support rods mounted on an abacus frame to be slidable in a vertical direction; an abacus bead position detecting unit including a plurality of position detecting means for detecting a position change of each abacus bead from lower parts of the abacus beads fitted on each of the unit-specific support rods; an abacus bead guide panel in which unit-specific guide blocks for guiding movement of the abacus beads fitted on each of the unit-specific support rods are integrally connected to cover all of the abacus bead position detecting unit; and a plurality of abacus bead moving members provided in a number which is the same as that of the abacus beads in the guide panel to movably support the abacus beads fitted on each of the support rods.

According to the present invention, the guide panel may include a plurality of lower compartments that simultaneously cover the unit-specific position detecting means on one panel, and a plurality of upper compartments in which the abacus beads fitted on each unit-specific support rod are arranged, and the lower compartments may be formed on lower surfaces of the guide blocks, and the upper compartments may be formed on upper surfaces of the guide blocks. Furthermore, the moving member may include a head part having a V-shaped seating notch into which a peripheral edge of each abacus bead is fitted, and an elongated extension protrusion protruding downwards from a center of the head part so that a sensor of each position detecting means detects the position change of the abacus bead, and the head part may have a width that is equal to or less than ⅔ of a thickness of the abacus bead. According to another embodiment, the moving member may have a trapezoidal structure configured such that the head part is wide at a lower end thereof and is gradually tapered from the lower end to an upper end thereof, when viewed from a side of the head part.

A plurality of guide holes may be formed in a surface of each unit-specific guide block of the guide panel to pass through a center of a common length of the upper and lower compartments and thereby guide the movement of the moving member. The guide holes may include a short guide hole and a long guide hole of elongated shapes in a boundary surface between the upper compartment and the lower compartment of each unit-specific guide block so that the extension protrusion of each unit-specific moving member is fitted to be freely movable, and the short guide hole may be provided in the form of one space on an upper portion of each unit-specific guide block, while the long guide hole may be provided, in the form of four partitioned spaces corresponding to a length of the short guide hole, on a lower portion of each unit-specific guide block.

The moving member may include locking protrusions that are provided under the head part to be spaced apart therefrom by a predetermined distance and protrude in a horizontal direction, and the locking protrusion may protrude in a longitudinal direction of the head part.

Advantageous Effects

An electronic abacus according to the present invention is advantageous in that abacus beads fitted on each support rod can be mounted on an abacus bead moving member simultaneously, and the removal of moving members can be prevented even when the moving members lean to one side by tilting an abacus frame, thus making it simpler and easier to assemble.

DESCRIPTION OF DRAWINGS

FIGS. 1A and 1B show diagrams illustrating the configuration of a conventional electronic abacus;

FIG. 2 is a perspective view showing the internal configuration of an electronic abacus according to the present invention;

FIGS. 3A, 3B and 3C show a plan view, a bottom view, and a front view of an abacus bead guide panel shown in FIG. 2;

FIGS. 4A and 4B show side views illustrating various shapes of an abacus bead moving member shown in FIG. 2;

FIGS. 5A and 5B show sectional views illustrating the assembled state and the use state of the electronic abacus according to the present invention;

FIG. 6 is a perspective view showing a modification of the abacus bead moving member shown in FIGS. 2 and 4; and FIG. 7 is a sectional view showing the installed state of the abacus bead moving member of FIG. 6.

MODE FOR INVENTION

Hereinafter, details and advantages of the present invention will be described in detail with reference to embodiments of the invention shown in the accompanying drawings.

In the description of the embodiments of the invention, parts other than essential parts are not illustrated and described. Like reference numerals designate like elements throughout the specification, and detailed description thereof will not be repeated.

FIG. 2 is a perspective view showing the internal configuration of an electronic abacus according to the present invention, FIG. 3 shows a plan view, a bottom view, and a front view of an abacus bead guide panel shown in FIG. 2, FIG. 4 shows side views illustrating various shapes of an abacus bead moving member shown in FIG. 2, and FIG. 5 shows sectional views illustrating the assembled state and the use state of the electronic abacus according to the present invention.

The main components of the electronic abacus according to the present invention basically includes a plurality of abacus beads 300 that are fitted on each of unit-specific support rods 200 mounted on an abacus frame 100 (see FIG. 5) to be slidable in a vertical direction, and a plurality of abacus bead position detecting means 511 (hereinafter referred to as "position detecting means") for detecting a position change of each abacus bead from lower parts of the abacus beads 300 fitted on each of the unit-specific support rods 200. The electronic abacus may further include an abacus bead guide panel 400 (hereinafter referred to as a "guide panel") in which unit-specific guide blocks 410 for guiding the movement of the abacus beads fitted on each of the unit-specific support rods 200 are integrally connected to completely cover an abacus bead position detecting unit 510 composed of the position detecting means 511 on a printed circuit board 500, and a plurality of abacus bead moving members 600 (hereinafter referred to as "moving members") that are provided in a number which is the same as that of the abacus beads 300 in the guide panel 400 to movably support the abacus beads 300 fitted on each of the support rods 200. Here, the position detecting means 511 may include various sensors 511a to sense the movement of the moving member 600, for example, an optical sensor, a proximity sensor (position sensor or displacement sensor), an illuminance sensor, and the like. Alternatively, as described in the above-mentioned patent document proposed by the applicant of the invention, the position detecting means may be composed of an infrared light emitting part and a light receiving sensor that correspond to each other, thus turning on or off the sensor depending on the movement of the moving member 600 and thereby detecting the position of the abacus bead.

Reference numeral "520" of FIG. 2 denotes a 'control unit', which receives and processes the movement information of the moving member sensed and transmitted by each position detecting means 511 of the abacus bead position detecting unit.

For reference, 'each unit' in the phase 'each unit-specific' mentioned throughout the specification refers to units of one, ten, hundred, thousand, ten thousand, hundred thousand, million, ten million, etc. in the abacus, and indicates digit units of the abacus beads 300 that are sequentially arranged on the guide panel 400.

In the above configuration, the guide panel 400 has a plurality of lower compartments 411 that may simultaneously cover the unit-specific position detecting means 511 on one panel. The lower compartments 411 are formed on the lower surfaces of the guide blocks 410 to cover the position detecting means 511 forming the abacus bead position detecting unit 510. Furthermore, the guide panel 400 has a plurality of upper compartments 412 in which the abacus beads fitted on each unit-specific support rod are arranged. The upper compartments 412 are formed on the upper surfaces of the guide blocks 410, and guide holes 413 and 414 are formed on the surfaces of the guide blocks 410 to pass through the center of the common length of the upper and lower compartments 412 and 411 and thereby guide the movement of the moving member 600. According to this embodiment, the unit-specific guide blocks 410 forming the guide panel 400 are preferably formed such that the lower compartments 411 are narrower than the upper compartments 412.

The moving member 600 includes a head part 610 having a V-shaped seating notch 611 into which a peripheral edge of each abacus bead 300 is fitted, and an elongated extension protrusion 620 that protrudes from a center of a lower end of the head part 610 to cover the sensor of each position detecting means 511 and detects the position change of the abacus bead 300. According to the present invention, the width of the head part 510 is formed to be equal to or less than the thickness of each abacus bead 300. Preferably, it is important that the head part be formed to have the width that is equal to or less than ⅔ of the thickness of each abacus bead, thus reducing a proportion of the head part 610 in the total weight of each moving member 600. Thus, in order to prevent the abacus bead from being sensed by another sensor or prevent the operation of the sensor from being obstructed only with slight misalignment of the abacus bead 300, the width of the extension protrusion 620 provided on the lower portion of each moving member 600 may set to cover the sensor of the position detecting means 511 (see FIG. 5b). Therefore, even if the extension protrusion 620 is formed to be thin, a weight difference between the extension protrusion 620 and the head part 610 is minimized. Thus, even if the moving members 600 lean to one side by tilting the abacus frame 100 to one side so as to mount the abacus beads 300 on the unit-specific moving members 600 simultaneously, the moving members 600 remain mounted on the unit-specific guide blocks 410 without spilling out from the guide panel 400.

As another example, in order to prevent the moving members from spilling out due to a weight difference between the head part 610 and the extension protrusion 620, the shape of a moving member 600' may be provided as shown in FIG. 4b. When viewed from the side, such a moving member 600' has a trapezoidal structure configured such that the head part 610 is wide at a lower end thereof and is gradually tapered from the lower end to an upper end thereof. Therefore, even if the moving members 600' lean to one side by tilting the abacus frame 100, the center of gravity of the head part 610 is located at a lower position, so that the spilling of the moving members from the guide panel 400 may be minimized.

Meanwhile, the above-described guide holes in the guide panel 400 include short guide holes 413 and long guide holes 414 of elongated shapes in a boundary surface between the upper compartment 412 and the lower compartment 411 of each unit-specific guide block 410 so that the extension protrusion 620 of each unit-specific moving member 600 is fitted to be freely movable. The short guide hole 413 is provided in the form of one space on an upper portion of each unit-specific guide block 410, while the long guide hole 414 is provided, in the form of four partitioned spaces corresponding to the length of the short guide hole 413, on a lower portion of each unit-specific guide block 410. The reason why the long guide hole 414 is formed of four partitioned spaces is as follows: when the abacus frame is obliquely tilted so as to mount the abacus beads 300 on each unit-specific moving member 600 simultaneously in the assembly process of the electronic abacus according to the present invention, the partitioned spaces prevent the moving members 600 from leaning to one side and thereby prevent the weight of the moving members from concentrating on the lowest head part 610. In addition, since the head part 610 of the moving member 600 is thinner in thickness than the abacus bead 300, the moving members may lean to one side when the abacus frame 100 is tilted to one side, so that the abacus beads 300 fitted on each unit-specific support rod 200 may not be fitted on the head parts 610 of the moving members simultaneously. The above-described configuration can solve the problem. Thereby, each moving member 600 is caught by an end of each long guide hole 414 so that the head parts 610 are kept spaced apart from each other as shown in FIGS. 5a and 5b. Moreover, the spacing of the seating notch 611 formed in the head part 610 of each unit-specific moving member 600 may be kept constant at the thickness of the abacus bead. Therefore, it is possible to solve the problem where the moving members 600 spill out due to their weight concentration and the abacus beads 300 may not be fitted into the head parts 610 of the moving member simultaneously.

FIG. 6 is a perspective view showing a modification of the abacus bead moving member shown in FIGS. 2 and 4, and FIG. 7 is a sectional view showing the installed state of the abacus bead moving member of FIG. 6.

According to the present invention, in order to prevent the spilling of the moving members due to the weight difference between the head part 610 and the extension protrusion 620, the shape of a moving member 600" may be further provided as shown in FIG. 6. The moving member 600" may include locking protrusions 621 that are provided under the head part 610 to be spaced apart therefrom by a predetermined distance and protrude in a horizontal direction. The locking protrusion 621 may preferably protrude in a longitudinal direction of the head part 610.

When the moving member 600" configured as such is mounted on the guide hole 413 or 414 formed in each unit-specific guide block 410 of the guide panel 400, the moving member 600" rotates 90 degrees so that each guide hole 413 or 414 and the seating notch 611 of the moving member are on the same line. In this state, the extension protrusion 620 is inserted into each guide hole 413 or 414 and then the moving member rotates 90 degrees again. Then, the moving member 600" is locked on the guide block 410 by the locking protrusion 621. Therefore, even if the moving member 600" lean to one side by tilting the abacus frame 100, the moving member can be prevented from spilling out from the guide panel 400.

While the present invention has been particularly described with reference to exemplary embodiments, the exemplary embodiments have been described for illustrative purposes, and the scope of the present invention is not limited to the embodiments. Accordingly, it will be understood by those of ordinary skill in the art that various changes and modifications may be made without departing from the spirit and scope of the present invention as defined by the appended claims.

The invention claimed is:

1. An electronic abacus, comprising:
   a plurality of abacus beads fitted on each of unit-specific support rods mounted on an abacus frame to be slidable in a vertical direction;
   an abacus bead position detecting unit comprising a plurality of position detecting means for detecting a position change of each abacus bead from lower parts of the abacus beads fitted on each of the unit-specific support rods;
   an abacus bead guide panel in which unit-specific guide blocks for guiding movement of the abacus beads fitted on each of the unit-specific support rods are integrally connected to cover all of the abacus bead position detecting unit; and
   a plurality of abacus bead moving members provided in a number which is the same as that of the abacus beads in the guide panel to movably support the abacus beads fitted on each of the support rods.

2. The electronic abacus of claim 1, wherein the guide panel comprises a plurality of lower compartments that simultaneously cover the unit-specific position detecting means on one panel, and a plurality of upper compartments in which the abacus beads fitted on each unit-specific support rod are arranged, and the lower compartments are formed on lower surfaces of the guide blocks, and the upper compartments are formed on upper surfaces of the guide blocks.

3. The electronic abacus of claim 1, wherein the moving member comprises a head part having a V-shaped seating notch into which a peripheral edge of each abacus bead is fitted, and an elongated extension protrusion protruding downwards from a center of the head part so that a sensor of each position detecting means detects the position change of the abacus bead, and the head part has a width that is equal to or less than ⅔ of a thickness of the abacus bead.

4. The electronic abacus of claim 1, wherein the moving member has a trapezoidal structure configured such that the head part is wide at a lower end thereof and is gradually tapered from the lower end to an upper end thereof, when viewed from a side of the head part.

5. The electronic abacus of claim 2, wherein a plurality of guide holes is formed in a surface of each unit-specific guide block of the guide panel to pass through a center of a common length of the upper and lower compartments and thereby guide the movement of the moving member.

6. The electronic abacus of claim 5, wherein the plurality of guide holes comprises a short guide hole and a long guide hole of elongated shapes in a boundary surface between the upper compartment and the lower compartment of each unit-specific guide block so that the extension protrusion of each unit-specific moving member is fitted to be freely movable, and the short guide hole is provided in the form of one space on an upper portion of each unit-specific guide block, while the long guide hole is provided, in the form of four partitioned spaces corresponding to a length of the short guide hole, on a lower portion of each unit-specific guide block.

7. The electronic abacus of claim 1, wherein the moving member comprises locking protrusions that are provided under the head part to be spaced apart therefrom by a predetermined distance and protrude in a horizontal direction, and the locking protrusion protrudes in a longitudinal direction of the head part.

* * * * *